United States Patent [19]

Ruhnau

[11] Patent Number: 4,703,388
[45] Date of Patent: Oct. 27, 1987

[54] OVERVOLTAGE PROTECTION CIRCUIT ARRANGEMENT FOR VEHICULAR ANTISKID BRAKE CONTROL SYSTEMS

[75] Inventor: Gerhard Ruhnau, Neustadt, Fed. Rep. of Germany

[73] Assignee: WABCO Westinghouse Fahrzeugbremsen GmbH, Hanover, Fed. Rep. of Germany

[21] Appl. No.: 779,329

[22] Filed: Sep. 23, 1985

[30] Foreign Application Priority Data

Sep. 25, 1984 [DE] Fed. Rep. of Germany ....... 3435055

[51] Int. Cl.[4] .............................................. H02H 3/20
[52] U.S. Cl. .................................... 361/91; 307/10 R
[58] Field of Search ................ 361/56, 86, 91; 307/9, 307/10 R

[56] References Cited

U.S. PATENT DOCUMENTS

| | | | |
|---|---|---|---|
| 3,852,613 | 12/1974 | Wienecke | 307/10 R |
| 4,161,759 | 7/1979 | Stein | 361/91 X |
| 4,503,477 | 3/1985 | Henriksen et al. | 361/91 X |
| 4,573,099 | 2/1986 | Ganesan et al. | 361/91 X |
| 4,589,049 | 5/1986 | Kramrein | 361/91 X |
| 4,590,533 | 5/1986 | Murata | 361/91 |

Primary Examiner—A. D. Pellinen
Assistant Examiner—Derck S. Jennings
Attorney, Agent, or Firm—J. B. Sotak

[57] ABSTRACT

A circuit arrangement for protecting the antilocking electrical system from overvoltages developed in the vehicle's electrical systems. Such overvoltages can be caused by a load dump and can lead to destruction of the vehicle's electrical system. To sense an overvoltage condition, a test circuit is provided which is connected to the vehicle's electrical system. The voltage test circuit provides an output signal when the voltage of the vehicle's electrical system exceeds a first threshold value. This output signal is used to switch the final stage of the antilocking electrical system. The overvoltage is thereby conducted directly to one or more low-resistance solenoid valves which limit the voltage in such a way that it no longer presents any danger to the vehicle's electrical system.

4 Claims, 2 Drawing Figures

OVERVOLTAGE PROTECTION CIRCUIT ARRANGEMENT FOR VEHICULAR ANTISKID BRAKE CONTROL SYSTEMS

FIELD OF THE INVENTION

This invention relates to a system for the protection of an electronic antilock or antiskid apparatus against unpredictable overvoltages. Namely, the present invention involves equipment for the protection of an electronic antiskid system against overvoltage conditions. Under certain circumstances, a number of disturbances in the vehicle's electrical system can cause an overvoltage problem. Such an overvoltage can cause damage to the vehicle's electrical system and, in particular, to the electronic antiskid system. An overvoltage condition may be caused by a so-called load dump situation. An excessive amount of voltage is developed during a load dump condition, which occurs when the generator or the alternator charges the battery with a relatively high charging current. Under this condition, the battery is immediately disconnected from the system by the main power cutoff or contact fault equipment. This is the normal or customary practice, if shortly after a start-up procedure, the main power switch is activated in a vehicle which has a discharged battery. Because of the sudden load dump, the magnetic energy which is stored in the generator is discharged into the vehicle's electrical system. Under certain circumstances, particularly in vehicles having 24 volt electrical systems, it is not uncommon to generate a ramp voltage having a peak amplitude of up to 190 volts and a decay time in excess of 500 ms.

BACKGROUND OF THE INVENTION

In most existing vehicle electrical systems, especially those which have a relatively high-powered final stage, it was believed that high voltage loads or surge voltages presented no extenuating problems.

Thus, in the past, it was a very rare occasion to provide an interconnection of the generator to an electronic field regulator with integrated overvoltage protection, such as shown and described in the Technical Notice, Generators, Bosch, issued May 21, 1974. In this case, the overvoltage protection essentially consists of a thyristor which is used to short-circuit the excitation winding of the generator in case of an overload fault. However, it has been found that such a special field regulator with overvoltage protection system had not been included in many of the existing vehicular antiskid brake control systems.

OBJECTS AND SUMMARY OF THE INVENTION

Accordingly, it is an object of the present invention to provide a unique circuit arrangement of the above-mentioned type which will protect a vehicular antiskid electronic system against a destructive overvoltage condition which normally occurs during a load dump operation.

Another object of this invention is to provide a circuit arrangement for the protection of a vehicular antiskid electrical control system, in particular to the final output stages which have the power stages to protect against overvoltage pulses in the electrical system, especially an overvoltage condition caused by a load dump situation comprising, a voltage test circuit having an input which is adapted to sense an overvoltage condition, and said voltage test circuit having an output which is connected to the final stage of the antiskid electrical system in such a manner that the power transistor of the final stage is rendered conductive by an overvoltage pulse to dissipate any electromagnetic storage energy. Since the transistors of the final stage or output portion are those primarily endangered by a short-circuited condition and also control the solenoid valves, the latter are reliably protected. Moreover, by employing the subject invention, not only the antiskid electrical control system itself, but also, as a result of the attenuation of the overvoltage, all of the other vehicle electrical systems are effectively protected.

REFERENCE TO THE DRAWINGS

The invention is explained in greater detail below with reference to the following drawings:

FIG. 1 shows a graphical illustration of the power surge which is caused by a load dump condition and which occurs over a certain period of time; and FIG. 2 shows a schematic circuit diagram of the overvoltage protection system according to this invention.

DETAILED DESCRIPTION OF THE INVENTION

Figure 1:
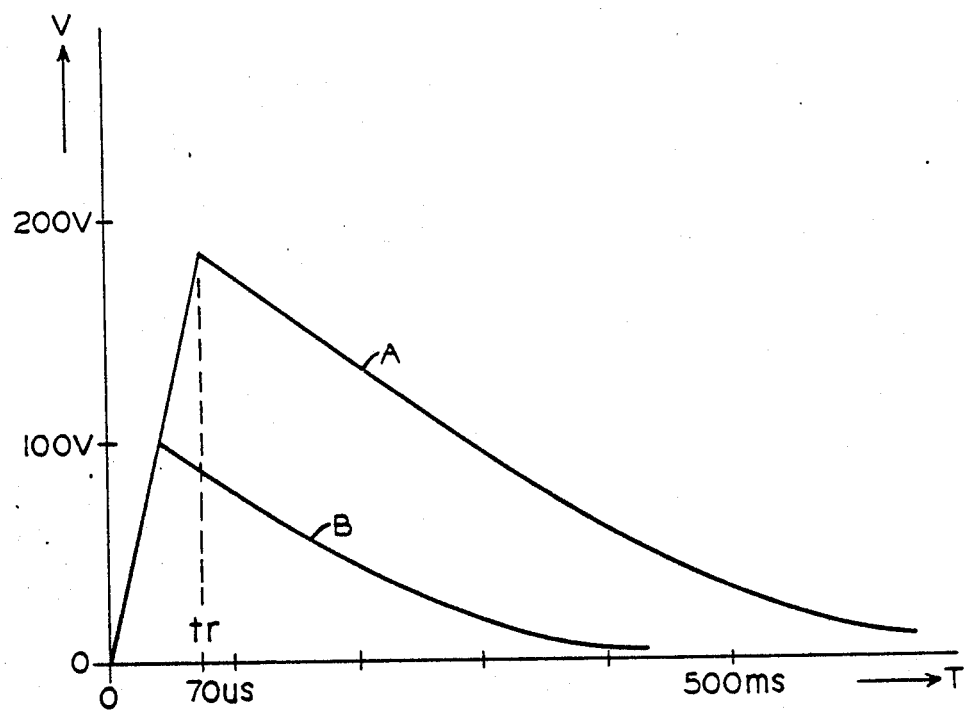

As shown in FIG. 1, a typical undampened load dump condition is represented by the characteristic curve A which shows that the pulse has a peak voltage of about 190 volts extending over a time period of more than 500 milleseconds (ms). It will be seen that the rise time of the pulse surge is about 70 microseconds.

The load dump pulse is somewhat attenuated because of the constant base load of the vehicle's electrical system. However, a more effective manner of attenuating the high voltage pulse is attained by utilizing the unique concept of the present invention. The peak voltage of these surge pulses is effectively attenuated to approximately 100 volts, as shown in FIG. 1 by curve B.

Figure 2:
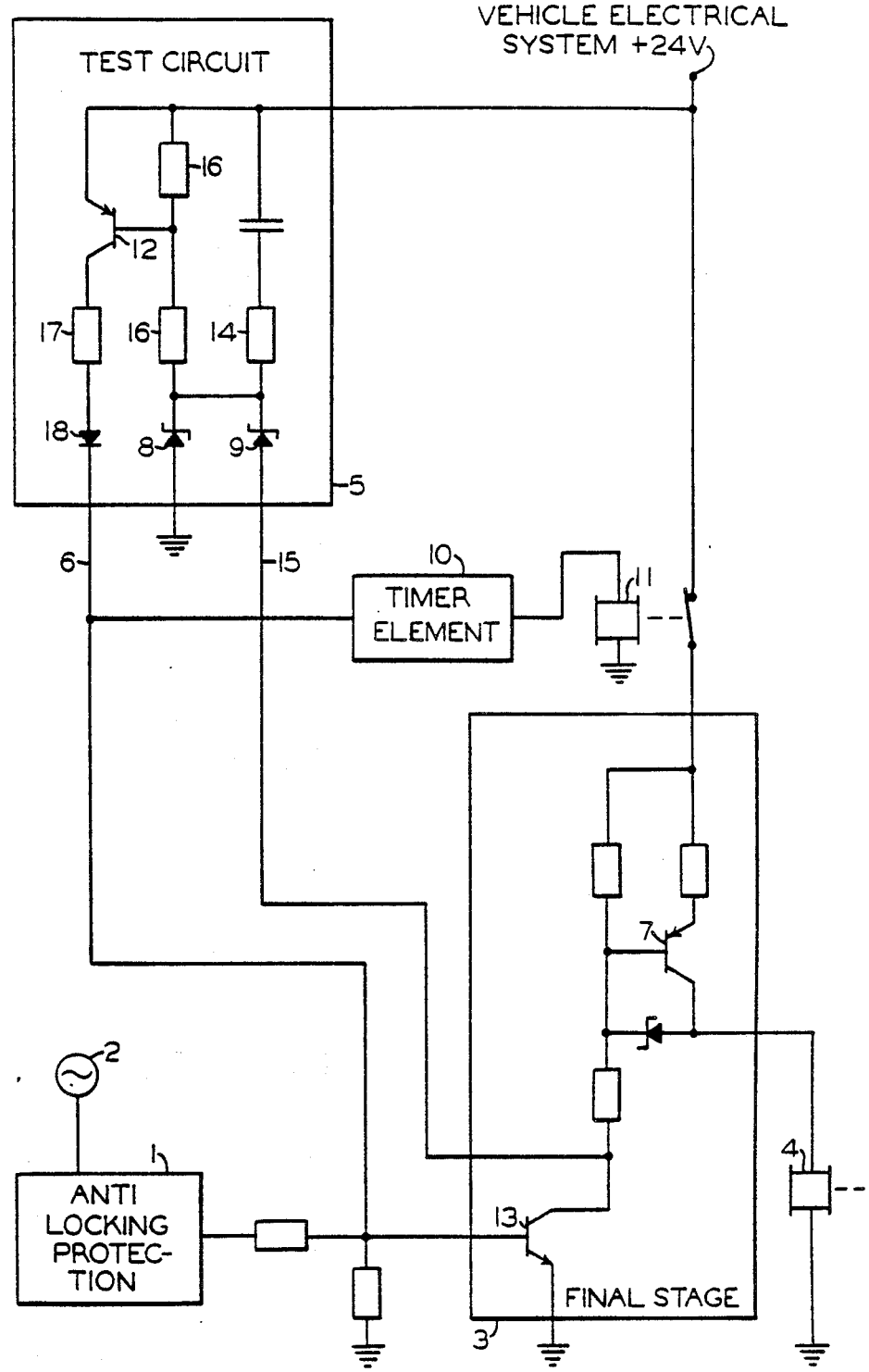

In FIG. 2, the characters 1 and 3 refer to an antiskid electrical system of the final stage of the vehicular wheel control. The vehicular system receives an input from a conventional tachometer 2 which generates a signal in accordance with the speed of the wheel to be controlled. The output of the vehicular electrical system 1 is connected to the power final stage 3. The final stage 3 operates an electromagnetic solenoid valve 4 which controls the wheel of the vehicle in such a manner that the lock-up of that wheel is prevented.

The conventional circuitry of the antiskid protection electrical system as well as the final stage are not part of the invention and, therefore, no detailed description is included herein for the purpose of convenience. As shown, the final stage 3 of the antiskid protection electrical system 1 is connected to the vehicle's electrical supply system, namely, the 24 volt power supply, by means of an electromagnetic relay 11. In order to attenuate and subdue the load dump pulse in the vehicle's electrical system in case of a fault, the voltage in the vehicle's electrical system is sensed and controlled by a voltage detecting or testing circuit 5.

When the input charging voltage reaches or exceeds a value or a level of about 40 volts, namely, above a first voltage threshold, the Zener diode 8 is rendered conductive. As soon as this occurs, the base electrode potential of a transistor 12 is decreased in relation to the supply potential which thereby causes the transistor 12 to become conductive. As shown, the transistor 12 and the supply voltage are connected to the vehicle electrical system. As shown, the base electrode is connected to an attenuator network 16.

The collector electrode of transistor 12 is connected to a line 6 by means of a resistance 17 and a diode 18. It will be seen that the base electrode of transistor 13 of the final stage 3 as well as a power transistor 7 are controlled by line 6. The operation of the transistors takes place very quickly in order to reduce the time period in the analog range. When the transistors 13 and 7 are rendered conductive, the load dump pulse is readily dissipated and rapidly dampened by the relatively low resistance of the solenoid valves 4.

In most situations, a high voltage surge is not dangerous and does not detrimentally effect the power transistor 7.

It will be appreciated that a four-wheel antiskid or 4-channel antilocking electrical system for a motor vehicle has four solenoid valves 4. Since each solenoid valve has an inlet and an outlet valve with a separate winding, there are a total of eight windings which are connected parallel to the vehicle's electrical system when a load dump occurs. When these windings have a resistance of approximately 14 Ohms, the total net resistance is approximately 3.5 Ohms. Combined with the base load of the vehicle's electrical system, we have a loading of the generator which corresponds to the internal resistance. For this reason, the voltage of the unloaded pulse is effectively cut in half as shown by the dashed portion of the curve in FIG. 1.

When the decreasing load dump pulse falls short of the breakdown voltage of the first Zener diode 8, the state of the electrical condition of the final stage 3 remains unchanged since a second Zener diode 9 which has a breakdown voltage of about 36 volts, namely, the second voltage threshold, remains conducting. This Zener diode 9 is connected by line 15 to the collector electrode of the transistor 13 and keeps the collector electrode conductive or in an open condition. The final stage 3 is switched back into the closed or non-conducting condition when the level falls below the breakdown voltage of the second Zener diode 9.

It will be appreciated that the Zener diodes 8 and 9 cause a hysteresis effect in the circuit characteristics. Therefore, the rapid return to a lower voltage level protects the power transistor in the analog range.

While the RC circuit elements 14 are effective in attenuating any undesirable transients, it has been found that the resistor and capacitor are not absolutely necessary. The test circuit 5 can, of course, be modified and may take the form of an integrated voltage comparator circuit.

Normally when a single load dump pulse occurs, the power surge which flows through the conducting power transistor 7 does not result in any damage or destructive effect to the transistor. However, if a repeated or continuous contact fault occurs, the high voltage surge pulses will be continuously one after the other and therefore subject the transistor 7 to be unduly heated and could damage the semiconductor. In order to prevent the repeated surge occurrence, it has been advisable to provide a timer element 10 in one refinement of the invention. This timer element measures the number of individual load dump processes and switches the valve relay 11 after a predetermined number so that the final stage is completely and safely separated from the vehicle's electrical system.

It will be understood that various modifications and changes may be made by those persons skilled in the art without departing from the spirit and scope of the invention. Therefore, it will be appreciated that all modifications, ramifications, and equivalents will be readily comprehended by skilled artisans, and thus it is understood that the invention is not limited to the exact embodiment but is to be accorded the full scope and protection of the appended claims.

Having thus described the invention, what I claim as new and desire to secure by Letters Patent, is:

1. A circuit arrangement for the protection of a vehicular antiskid electrical control system, and in particular to final stages which have power transistors to protect against overvoltage pulses in an electrical control system, especially an overvoltage condition caused by a load dump situation comprising:
   (a) a voltage test circuit having an input which is adapted to sense an overvoltage condition,
   (b) said voltage test circuit having an output which is connected to a final stage in such a manner that a power transistor of the final stage is rendered conductive by an overvoltage pulse to dissipate any electromagnetic storage,
   (c) said voltage test circuit includes a first Zener diode which becomes conductive when the level of an overvoltage pulse exceeds a first voltage threshold, and
   (d) said voltage test circuit includes a second Zener diode which is responsive to an overvoltage condition when it drops below a second threshold, wherein the second voltage threshold is lower than the first voltage threshold.

2. The circuit arrangement, according to claim 1, characterized by the fact that the voltage test circuit again cuts off the power transistor when the voltage drops below the second voltage threshold.

3. The circuit arrangement, according to claim 2, characterized by the fact that a timer element is utilized to measure the duration of the overvoltage condition.

4. The circuit arrangement, according to claim 3, characterized by the fact that the timer element energizes an electromagnetic relay to disconnect the final stage from its power supply source.

* * * * *